Patented Apr. 7, 1942                                   2,279,138

UNITED STATES PATENT OFFICE 2,279,138

PROCESS OF MAKING ALKYL AMINO FATTY ACID

Clyde Overbeck Henke, Wilmington, Del., and Frank McGrew Schofield, Woodstown, N. J., assignors to E. I. du Pont de Nemours & Company, Wilmington, Del., a corporation of Delaware No Drawing. Application March 8, 1941, Serial No. 382,446

5 Claims. (Cl. 260—404)

This invention relates to the production of amino-fatty acids and more particularly to the production of alpha-mono- and alpha-dialkyl-amino fatty acids from monocarboxylic fatty acids that contain 8 or more carbon atoms. The products are surface active agents, which are valuable textile assistants as well as intermediates for other valuable textile assistants.

This invention has as an object the preparation of alkylamino-fatty acids, and particularly alpha-dialkylamino fatty acids, from alpha halogeno monocarboxylic fatty acids that contain 8 or more carbon atoms. A further object is to prepare products of high quality in good yield. A still further object is to prepare these products as economically as possible. Other objects will appear hereinafter.

These objects are accomplished by the following invention which comprises reacting alpha halogeno aliphatic monocarboxylic acids which contain 8 or more carbon atoms with water-soluble, aliphatic, primary or secondary amines of low molecular weight in an aqueous solution of a strongly basic alkali metal compound.

The following examples illustrate but do not limit the invention.

Example I 97 grams of dimethylamine (technical grade) are dissolved in a solution consisting of 587 grams of technical 30% caustic soda solution and 1085 grams of water, preferably within the temperature range of 0° to 20° C. 744 grams of crude alpha-bromo-stearic acid with an organic bromine content of about 25.5% (theory for alpha-bromostearic acid prepared from technical double pressed stearic acid containing palmitic acid and having an acid number of 208 and an iodine number of 6 is 25.3% bromine) are added to the aqueous caustic soda solution of dimethylamine. The alpha-bromostearic acid may be added in molten or in shredded solid form, and the addition is made preferably at 15°–20° C. over about 1 hour. The reaction mass is then allowed to warm up to 25° C. over 4 to 6 hours while agitating, after which it is agitated at 25°–35° C. for at least 12 hours and finally allowed to stand for about 6 days. Occasional stirring during this standing period is desirable but not essential. The reaction is carried out in a closed vessel, but pressures greater than atmospheric need not be employed.

The reaction which takes place may be illustrated by the following equation:

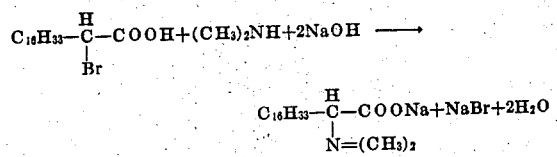

During the agitation period subsequent to the addition of the alpha-bromostearic acid, the reaction mixture changes from a very non-homogeneous mass to a stable, clear, transparent homogeneous syrupy liquid. The color of the product is dependent upon the color and quality of the alpha-bromostearic acid; it is normally amber colored, when prepared from crude alpha-bromostearic acid. The aqueous paste of sodium alpha-dimethylamino stearate, produced in this way, is readily soluble in water and in dilute hydrochloric acid, forming clear solutions. The dilute aqueous solution shows excellent detergent and foaming properties. The product is also an excellent textile softening agent. The conversion of the alpha-bromo stearic acid to the corresponding alpha-dimethylamino derivative is nearly quantitative.

If desired, the small excess of caustic soda in the above described product may be neutralized with acid.

Example II

The procedure of Example I may be carried out using 2 moles of pure alpha-bromostearic acid; i. e., alpha-bromostearic acid containing only one atom of bromine per molecule and essentially free from stearic acid not brominated in the alpha-position may be used in place of the 2 moles of crude alpha-bromo-stearic acid. Similarly, either pure or crude alpha-bromo-caprylic, capric, lauric, myristic and palmitic acids may be used. Also, mixtures of the alpha-bromo- derivatives of any of these fatty acids may be used.

Example III

An aqueous caustic soda solution of dimethylamine is prepared by dissolving 54 grams of dimethylamine in 293 grams of 30% caustic soda solution and 700 grams of water, as described in Example I. 412 grams of crude alpha-bromo-fatty acids, containing 24.4% of total halogens expressed as bromine and prepared from a technical mixture of higher aliphatic mono-carboxylic acids having an acid number of 181, an iodine number of 10 maximum, and a melting point of 58°–60° C., are added as in Example I.

The reaction is carried out as described in Example I except that much more efficient and more prolonged agitation must be employed in order to reduce the particle size of the alpha-bromo-fatty acid mixture. This is essential in view of the lower solubility of the alpha-bromo-fatty acid mixture in the aqueous caustic soda solution of dimethylamine. The product is an amber to chocolate colored paste, which is sparingly soluble in water and which is an effective textile softening agent.

The preferred embodiment of this invention involves the reaction of a low molecular, water-soluble, aliphatic, secondary amine (such as dimethylamine) with an alpha-bromo-fatty acid, containing from 16 to 18 carbon atoms, in an aqueous solution containing approximately 2 or more moles of caustic soda per mole of alpha-bromo-fatty acid. This reaction is carried out at a pressure which is not substantially greater than atmospheric pressure and at temperatures within the range of about 20° C. to about 40° C., depending somewhat upon the reactants employed.

This invention contemplates the preparation of mono- and dialkylamino fatty acids by reacting alpha-halogeno aliphatic monocarboxylic acids which contain 8 or more carbon atoms with water-soluble, aliphatic, primary or secondary amines of low molecular weight in aqueous caustic soda solution.

As alpha-halogeno-fatty acids, there may be used fatty acids containing 8 or more carbon atoms, which are substituted in the alpha-position by a halogen atom and which contain at least one atom of halogen per molecule. Specific examples include the pure alpha-bromo or crude alpha-bromo derivatives of caprylic, capric, lauric, myristic, palmitic, stearic, arachidic and behenic acids. This invention also contemplates the use of the chloro-bromo-fatty acids described in Examples 4 and 5 of U. S. Patent No. 2,199,397.

Low molecular, water-soluble, aliphatic, primary or secondary amines which may be used include amines of the general formula

wherein R and R' represent alkyl or aliphatic groups containing not more than 4 carbon atoms and R' may also stand for hydrogen. R and R' may be substituted by hydroxyl or halogen groups.

Strongly basic substances other than caustic soda may be used as substitutes for caustic soda. Potassium hydroxide and sodium or potassium carbonates are examples of other useful strongly basic alkali metal compounds. It is essential that the basic substance be a stronger base than the amines used in this invention.

We prefer to use alpha-bromo aliphatic monocarboxylic acids which have been prepared by the bromination process that is described in U. S. Patent No. 2,199,397, in as much as they are essentially free from unbrominated acids and from other bromo-derivatives not containing bromine in the alpha position. The presence of these impurities in the alkylamino-fatty acids of the present invention or in other textile assistants, for which the latter are intermediates, is highly deleterious and undesirable. The presence of sodium stearate, for example, (resulting from unbrominated stearic acid) in the above mentioned amino-acid derivatives markedly and objectionably increases their viscosity and their tendency to form precipitates with magnesium, calcium and barium salts.

In the reaction of mono- and di-alkylamines with alpha-bromo-fatty acids, it is highly advantageous to carry out the reaction in an aqueous medium containing about 2 or more moles of caustic soda per mole of alpha-bromo-fatty acid. One mole of caustic soda is required to neutralize the acidic hydrogen of the carboxyl group, and one mole is required to neutralize the hydrobromic acid formed during the reaction.

When the reaction described in Example I is carried out in the presence of half as much caustic soda (i. e., 1.1 moles instead of 2.2 moles per mole of alpha-bromo-fatty acid), the product obtained is a stiff, light tan-colored paste. This stiff paste (which is believed to be alpha-dimethylamino-stearic acid) is appreciably less soluble in water and much more difficult to handle in subsequent chemical reactions than the stable, clear, transparent, homogeneous, syrupy paste obtained in Example I.

This invention offers a simple convenient, economical process for preparing alpha-alkyl-amino fatty acids. This process has the following advantages over known methods of preparing similar compounds.

1. A very small molar excess of amine (about 0.1 mole) is required as compared with 1 to 3 moles in the prior art. The cost of the product is thereby reduced considerably.

2. Only a simple mixing operation is involved. Elevated temperatures and pressures, filtrations, layer separations, etc. are avoided. By working at temperatures within the range of about 20° C. to about 40° C., troublesome side-reactions (such as the formation of unsaturated or hydroxy acids which are very objectionable by-products) are largely avoided.

3. There are no organic solvents or excess amine to handle and recover.

4. Cheap, commercial fatty acids may be brominated and subsequently converted in nearly quantitative yields to alpha-alkylamino derivatives of high quality by this process.

Resort may be had to such modifications and equivalents as fall within the spirit of the invention and the scope of the appended claims.

We claim:

1. A process of making an alpha dialkylamino fatty acid which comprises reacting an alpha halogeno aliphatic monocarboxylic acid which contains at least 8 carbon atoms with a water-soluble aliphatic amine having the general formula

in which R represents an alkyl group containing not more than 4 carbon atoms and R' represents an alkyl group containing not more than 4 carbon atoms, said reaction being carried out in an aqueous solution which contains at least 2 moles of a strongly basic alkali metal compound for each mole of alpha halogeno aliphatic monocarboxylic acid present in the reaction mixture.

2. A process of making an alpha dialkylamino fatty acid which comprises reacting an alpha bromo-aliphatic mono-carboxylic acid that contains at least 8 carbon atoms with a water-soluble dialkyl amine, the alkyl groups of which each contain from 1 to 4 carbon atoms, in an aqueous solution which contains at least 2 moles of an alkali metal hydroxide for each mole of alpha bromo aliphatic monocarboxylic acid present in the reaction mixture.

3. A process as defined in claim 2 in which an alpha bromo aliphatic monocarboxylic acid which has a straight chain of from 16 to 18 carbon atoms is used.

4. A process as defined in claim 2 in which sodium hydroxide is the alkali metal hydroxide which is used.

5. A process as defined in claim 2 in which dimethyl amine is the dialkyl amine which is used.

CLYDE O. HENKE.
FRANK McGREW SCHOFIELD.